Figure 4:
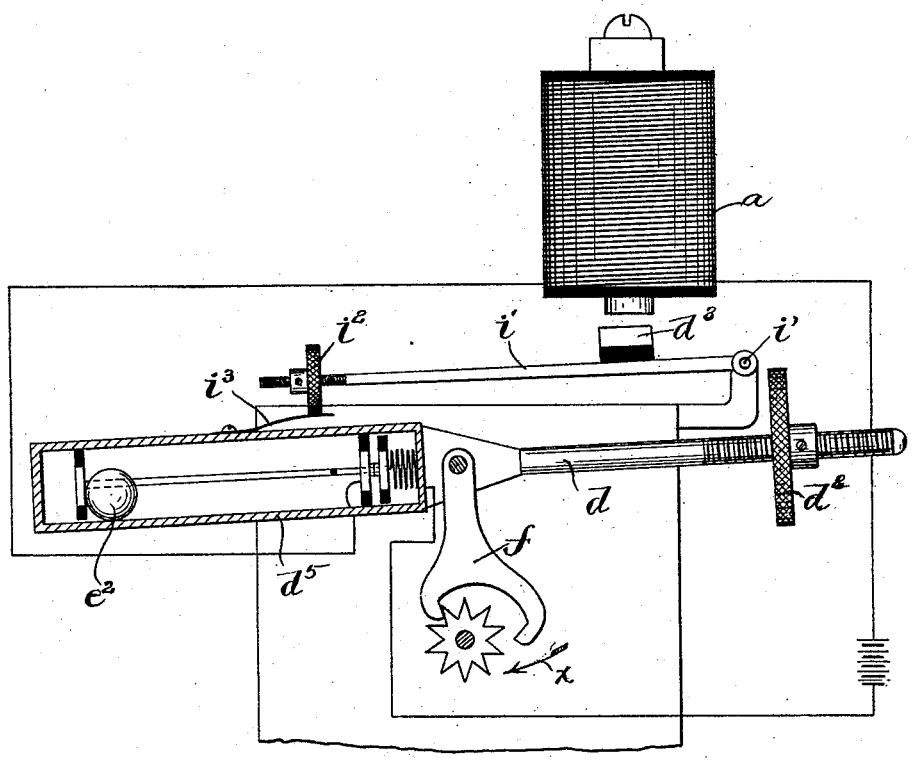

(No Model.) 2 Sheets—Sheet 1.
M. V. B. ETHRIDGE.
ELECTRIC CLOCK.
No. 486,838. Patented Nov. 22, 1892.
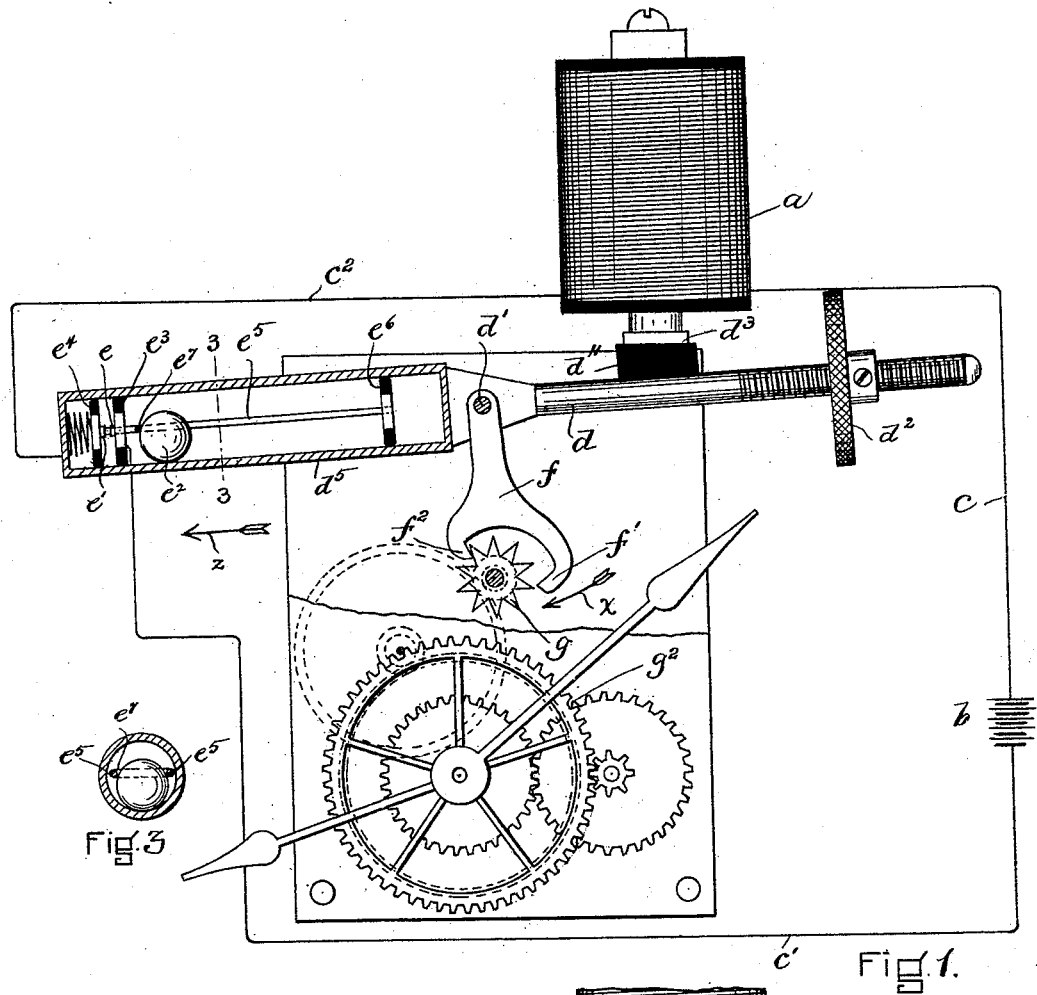
Fig.3
Fig.1.
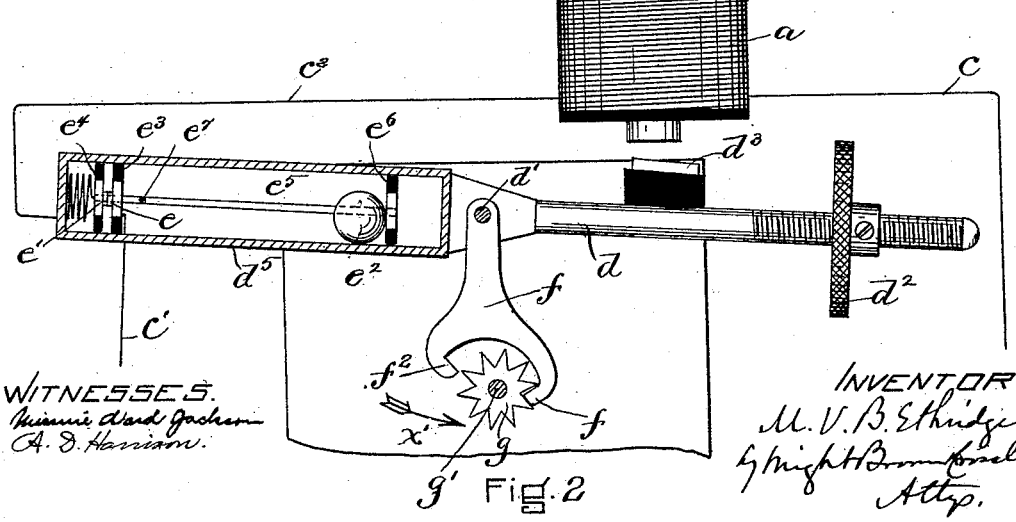
Fig.2
WITNESSES.
INVENTOR
M. V. B. Ethridge

United States Patent Office.

MARTIN V. B. ETHRIDGE, OF EVERETT, ASSIGNOR OF TWO-THIRDS TO HENRY E. WAITE, OF NEWTON, AND JOSEPH H. EASTMAN, OF BOSTON, MASSACHUSETTS.

ELECTRIC CLOCK.

SPECIFICATION forming part of Letters Patent No. 486,838, dated November 22, 1892.

Application filed January 18, 1892. Serial No. 418,440. (No model.)

*To all whom it may concern:*

Be it known that I, MARTIN V. B. ETHRIDGE, of Everett, in the county of Middlesex and State of Massachusetts, have invented certain new and useful Improvements in Electric Clocks, of which the following is a specification.

This invention has for its object to provide a simple and effective electro-mechanical motor for impelling a clock-train or other like mechanism; and it consists, mainly, in the improved electro-mechanical motor for clocks, comprising an electric circuit including an electro-magnet, a pivoted lever adapted to be oscillated and provided with a device—such as an escapement-arm—adapted to impart a step-by-step movement to a clock mechanism, a circuit closing and breaking device operated by oscillating movements on said lever, and consisting of, first, a loose weight adapted to be moved independently on said lever by gravitation, and, secondly, two electrodes supported by the lever and arranged to be alternately separated and connected by movements of the weight, said electrodes being included in the electric circuit, and means controlled by the electro-magnet, whereby a movement in one direction is imparted to said lever when the circuit is closed and in the opposite direction when the circuit is broken.

The invention also consists in certain improvements incidental to the general purposes of my invention, all of which I will now proceed to describe and claim.

Of the accompanying drawings, forming part of this specification, Figure 1 represents a side elevation of an electric clock embodying my invention, a part being shown in section. Figure 2 represents a side elevation of a portion of the construction shown in Fig. 1 at a different stage of the operation. Fig. 3 represents a section on line 3 3, Fig. 1. Fig. 4 represents a side elevation showing a different embodiment of my invention.

The same letters of reference indicate the same parts in all the figures.

In the drawings, and referring first to Figs. 1 and 2, $a$ represents an electro-magnet, which is included in an electric circuit, of which $b$ represents the battery or other source of electricity, and $c$ $c'$ $c^2$ the connecting-wires.

$d$ represents a lever, which is pivoted at $d'$ to a fixed support. Said lever is provided at or near one end with a weight $d^2$, which is preferably adjustable, and between said weight and the pivot $d'$ with an armature $d^3$, which is secured to and insulated from the lever by suitable insulation $d^4$, the armature being arranged to be attracted by the poles of the electro-magnet $a$.

A circuit closing and breaking device, adapted to be operated by oscillating movements of the lever $d$, is provided, said device including an electrode $e$, which is connected with the wire $c'$, an electrode $e'$, which is movable toward and from the electrode $e$ and is connected with the wire $c^2$, and a loose gravitating weight $e^2$, which is preferably a ball adapted to roll in a tube or guide $d^5$, constituting a part of the lever $d$, the arrangement being such that when the lever is in the position shown in Fig. 1 the weight or ball $e^2$ will move to the left-hand end of the tube $d^5$ and thus cause the separation of the electrode $e'$ from the electrode $e$ and break the circuit, and when the lever is in the position shown in Fig. 2 the ball will roll toward the other end of the tube $d^5$, and, striking a movable piece connected with the electrode $e'$, will move said electrode into contact with the electrode $e$, thus closing the circuit. When the circuit is broken, as shown in Fig. 1, the weight $d^2$, acting on the lever $d$, depresses the end carrying the armature and separates the latter from the poles of the electro-magnet. When the circuit is closed, as shown in Fig. 2, the magnet, becoming energized, attracts the armature, overcoming the weight $d^2$ and raising the end of the lever carrying said weight. It will be seen, therefore, that the lever $d$ is oscillated at a regular predetermined rate by the alternating action of the magnet and the weight $d^2$.

The details of construction of the circuit closing and breaking device may be variously modified. I have here shown the electrode $e$ supported by a ring $e^3$ of insulating material, the wire $c'$ being connected with said ring, which is affixed to the interior of the tube $d^5$. The movable electrode $e'$ is affixed to a ring $e^4$ of insulating material, which is movable in the tube $d^5$ and is provided with two rods $e^5$ $e^5$, which are connected with a movable ring $e^6$ of insulating material, located near the right-hand end of the tube. When the ball $e^2$ reaches the position shown in Fig. 1, it strikes a cross-bar $e^7$, extending between the rods $e^5$ $e^5$ and gives said rods and the ring $e^4$ and electrode $e'$ a movement in the direction indicated by the arrow $z$ in Fig. 1, thus breaking the circuit. When the ball reaches the position shown in Fig. 2, it strikes the ring $e^6$ and gives the latter, the rods $e^5$, ring $e^4$, and electrode $e'$ a movement in the opposite direction, thus closing the circuit. The movable ring $e^4$ is connected with the conducting-wire $c^2$, a portion of the latter being disposed in the tube $d^5$ in the form of a helix, as shown in Figs. 1 and 2, in order that the ring $e^4$ may have the requisite freedom of movement within the tube. The tube is preferably of glass, this material affording the desired insulation and presenting a smooth surface on which the ball $e^2$ may roll with the minimum of a friction. I prefer to exhaust the air from the tube to prevent the corrosion or sparking of the electrodes.

$f$ represents an escapement-arm, rigidly secured to the lever $d$ and adapted to be oscillated thereby. Said arm is provided with pallets $f'$ $f^2$, which are formed so that the oscillating movements of said arm will impart a step-by-step rotation to an escape-wheel $g$, the pallet $f'$ being moved in the direction indicated by the arrow $x$ in Fig. 1 by the movement of the lever which takes place when the circuit is broken and the lever is moved by the weight, said pallet striking a tooth of the wheel $g$ and giving the latter a partial rotation while the lever is moving from the position shown in Fig. 1 to that shown in Fig. 2. When the lever is being attracted by the armature, the pallet $f^2$, moving in the direction indicated by the arrow $x'$ in Fig. 2, strikes another tooth of the wheel $g$ and gives the latter another partial rotation in the same direction as before, the pallet $f'$ at the same time retreating, so that it does not interfere with the movement of the tooth adjacent to it. The escape-wheel $g$ is affixed to an arbor $g'$, which is geared to a time-train $g^2$, which may be organized in any suitable way.

It will be seen that the oscillating movements of the lever $d$ are positive, one movement being caused by the action of the weight $d^2$ and the other by the action of the magnet $a$. Hence said lever and magnet constitute a motor adapted to give a positive movement to the train $g^2$.

I do not limit myself to a spherical or rolling weight $e^2$, but may use any loose weight supported by a pivoted lever adapted to be moved independently by gravitation when said lever is inclined and impart a movement to a movable electrode carried by said lever.

It will be observed that in the construction above described the armature $d^3$ is attached directly to the lever $d$, so that the attractive force of the electro-magnet is exerted directly upon said lever. In case there is liable to be any considerable variation in the strength of the current flowing through the electro-magnet, the direct action of the current upon the lever will be objectionable, because when the current is strong a movement of the lever $d$ caused by the attraction of the armature will be more rapid than when the current is weaker. To overcome this objection, I have provided the construction shown in Fig. 4, which I prefer to use when there is liable to be any variation in the strength of the current. In the construction shown in Fig. 4 instead of attaching the armature $d^3$ directly to the lever $d$ I attach said armature to an intermediate lever or arm $i$, which is pivoted at $i'$ to a fixed support and is provided at its swinging end with a weight $i^2$, arranged to exert downward pressure on the end of the lever $d$ opposite the weighted end or the end carrying the weight $d^2$. The circuit breaking and closing devices are arranged so that the circuit is closed by the movement of the weight $e^2$ to the left-hand end of the tube $d^5$, as shown in Fig. 4, and broken by the movement of the weight toward the opposite end of said tube. When the circuit is closed, as shown in Fig. 4, the electro-magnet $a$ attracts the armature $d^3$ and therefore raises the weighted end of lever $i$. This movement separates the weight $i^2$ from a spring $i^3$, attached to the tube $d^5$, and permits the weight $d^2$ to depress the end of the lever on which it is located, thus giving the escapement $f$ a movement in the direction indicated by the arrow $x$. The tube $d^5$ is inclined by this movement, so that the weight $e^2$ gravitates toward the right-hand end of the tube $d^5$ and thus breaks the circuit, whereupon the armature $d^3$ is released and falls with the lever $i$ and weight $i^2$, the latter being thus caused to descend upon the spring $i^3$ and give the lighter end of the lever $d$ a downward movement, the arm $i$ and its weight being sufficiently heavy to overcome the weight $d^2$, so that when the circuit is broken the lever is given a movement which causes the escapement $f$ to move in the direction opposite that indicated by the arrow $x$.

It will be seen that by the arrangement last described and shown in Fig. 4 there can be no variation in the rapidity of either movement of the lever $d$, each movement being caused by gravitation.

It will be observed that in each of the constructions hereinbefore set forth means controlled by the electro-magnet are provided whereby a movement in one direction is imparted to the lever $d$ when the circuit is closed and a movement in the opposite direction when the circuit is broken. In Figs. 1 and 2 said means include the weight $d^2$ and the armature $d^3$, said weight being controlled by the electro-magnet in the sense that it is not permitted to act until the circuit is broken. In Fig. 4 the means include the weight $d^2$, armature $d^3$, and weighted arm $i$.

I claim--

1. The improved electro-mechanical motor for clocks, comprising an electric circuit, including an electro-magnet, a pivoted lever adapted to be oscillated and provided with a device, such as an escapement-arm, adapted to impart a step-by-step movement to a clock mechanism, a loose weight adapted to be moved independently on said lever by gravitation when the lever is inclined, electrodes supported by the lever and arranged to be alternately separated and connected by movements of the weight, said electrodes being included in the electric circuit, and means controlled by the electro-magnet, whereby a movement in one direction is imparted to said lever when the circuit is closed and in the opposite direction when the circuit is broken, as set forth.

2. The combination of an electric circuit, including an electro-magnet, a pivoted lever provided with a guide and with an escapement-arm adapted to be oscillated by said lever, a train, including an escape-wheel, to which a step-by-step movement is imparted by said arm, a loose weight adapted to be moved independently in said guide by gravitation when the lever is inclined, electrodes supported by the lever and arranged to be alternately separated and connected by movements of the loose weight, said electrodes being included in the electric circuit, and means controlled by the electro-magnet whereby a movement in one direction is imparted to said lever when the circuit is closed and in the opposite direction when the circuit is broken, as set forth.

3. The combination of an electric circuit, including an electro-magnet, a pivoted lever provided with a weight and with an escapement-arm adapted to be oscillated by said lever, a train, including an escape-wheel, adapted to be moved step by step by said arm, a loose weight adapted to be moved independently on said lever by gravitation when the lever is inclined, electrodes supported by the lever and arranged to be alternately separated and connected by movements of the weight, said electrodes being included in the electric circuit, a weighted arm pivoted to a fixed support and provided with an armature arranged to be attracted by the electro-magnet when the circuit is closed and thereby elevate the weighted arm, the latter being arranged to exert a downward pressure on the lever against the influence of the weight on said lever when the circuit is broken, the weighted arm giving the lever a movement in one direction when the circuit is broken while the weight on the lever gives the latter an opposite movement when the circuit is closed, as set forth.

4. As an improvement in electric clocks, a lever adapted to be oscillated and provided with a guide and with two electrodes, one fixed and the other movable relatively to the lever, and a loose weight adapted to be moved independently in said guide by gravitation, the arrangement being such that movements of the weight alternately separate and connect said electrodes, as set forth.

5. As an improvement in electric clocks, an oscillatory lever composed in part of an exhausted tube and provided with electrodes and with a gravitating weight, all located in said tube, the arrangement being such that movements of the weight alternately separate and connect said electrodes, as set forth.

In testimony whereof I have signed my name to this specification, in the presence of two subscribing witnesses, this 30th day of December, A. D. 1892.

MARTIN V. B. ETHRIDGE.

Witnesses:
C. F. BROWN,
A. D. HARRISON.